(12) United States Patent
Park et al.

(10) Patent No.: US 7,953,464 B2
(45) Date of Patent: May 31, 2011

(54) SLIDING-TYPE PORTABLE TERMINAL

(75) Inventors: Hyun-Jun Park, Gumi-si (KR);
Hyun-Suk Shin, Gumi-si (KR);
Sung-Sun Park, Gumi-si (KR);
Young-Jun Jung, Daegu (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 956 days.

(21) Appl. No.: 11/771,053

(22) Filed: Jun. 29, 2007

(65) Prior Publication Data

US 2008/0013289 A1 Jan. 17, 2008

(30) Foreign Application Priority Data

Jul. 13, 2006 (KR) .................. 10-2006-0065822
Mar. 27, 2007 (KR) .................. 10-2007-0029802
May 31, 2007 (KR) .................. 10-2007-0053348

(51) Int. Cl.
*H04M 1/00* (2006.01)

(52) U.S. Cl. ............... 455/575.4; 455/575.1; 455/575.3; 455/90.3; 379/433.01; 379/433.11; 379/433.12

(58) Field of Classification Search .................. 455/90.3, 455/550.1, 575.1, 575.4, 90.1, 575.3, 433.01, 455/433.11, 433.12; 235/472.01; D14/138, D14/140; 379/433.11, 433.12
See application file for complete search history.

(56) References Cited

U.S. PATENT DOCUMENTS

| | | | |
|---|---|---|---|
| 6,463,262 B1 * | 10/2002 | Johnson et al. | 455/90.1 |
| 6,782,242 B1 * | 8/2004 | Koleda et al. | 455/90.3 |
| 6,822,871 B2 | 11/2004 | Lee et al. | |
| 6,973,186 B2 * | 12/2005 | Shin | 379/433.12 |
| 7,003,104 B2 * | 2/2006 | Lee | 379/433.13 |
| 7,162,283 B2 * | 1/2007 | Bae et al. | 455/575.4 |
| 7,184,806 B2 * | 2/2007 | Bae | 455/575.4 |
| 7,319,892 B2 * | 1/2008 | Kato | 455/575.4 |
| 7,403,612 B2 * | 7/2008 | Nishihara | 379/433.12 |
| 7,450,968 B2 * | 11/2008 | Jung | 455/566 |
| 7,542,788 B2 * | 6/2009 | Lee | 455/575.4 |

(Continued)

FOREIGN PATENT DOCUMENTS

EP 1 422 911 A2 5/2004

(Continued)

*Primary Examiner* — Olumide T Ajibade Akonai
(74) *Attorney, Agent, or Firm* — Jefferson IP Law, LLP

(57) ABSTRACT

A sliding-type portable terminal is provided. The sliding-type portable terminal includes a first housing, a second housing sliding in a longitudinal direction of the first housing while facing the first housing, and an elastic member including a helical coil and free ends. The free ends extend from the coil in a direction away from each other and the elastic member provides an elastic force in a direction to move the free ends away from each other, in which the coil is interposed between the first housing and the second housing. An end of one of the free ends is rotatably supported on a first face of the first housing, and another of the free ends is extended toward the inside of the second housing and rotatably supported on an inner surface of the second housing. The sliding-type portable terminal has an advantage in that each of the free ends is located in one of the housings, by which the thickness of the terminal can be easily reduced and a space for a flexible printed circuit is easily ensured. Also, since sliding guides may be mounted to the first housing slidingly support the rear cover of the second housing, the terminal allows simple assembly, a reduced number of parts, and a slimmed profile thereof.

26 Claims, 18 Drawing Sheets

U.S. PATENT DOCUMENTS

| | | | |
|---|---|---|---|
| 7,627,355 B2 * | 12/2009 | Amano et al. | 455/575.4 |
| 2003/0064688 A1 * | 4/2003 | Mizuta et al. | 455/90 |
| 2006/0073858 A1 * | 4/2006 | Nagashima | 455/575.4 |
| 2007/0060220 A1 * | 3/2007 | Hsu | 455/575.4 |
| 2007/0155447 A1 * | 7/2007 | Gordecki | 455/575.4 |

FOREIGN PATENT DOCUMENTS

| | | |
|---|---|---|
| KR | 10-2005-0056705 A | 6/2005 |
| KR | 20-0395924 Y1 | 9/2005 |
| KR | 10-2005-0110280 A | 11/2005 |
| KR | 10-0537699 B1 | 12/2005 |
| KR | 10-2006-0099677 A | 9/2006 |
| KR | 10-2007-0033679 A | 3/2007 |
| WO | 2005/020452 A1 | 3/2005 |
| WO | 2007/021075 A1 | 2/2007 |

* cited by examiner

SLIDING-TYPE PORTABLE TERMINAL

PRIORITY

This application claims the benefit under 35 U.S.C. §119 (a) of a Korean patent application filed in the Korean Industrial Property Office on Jul. 13, 2006 and assigned Serial No. 2006-65822, of a Korean patent application filed in the Korean Industrial Property Office on Mar. 27, 2007 and assigned Serial No. 2007-29802, and of a Korean patent application filed in the Korean Industrial Property Office on May 31, 2007 and assigned Serial No. 2007-53348, the entire disclosures of which are hereby incorporated by reference.

BACKGROUND OF THE INVENTION

1. Field of the Invention

The present invention relates to a portable terminal. More particularly, the present invention relates to a sliding-type portable terminal in which a pair of housings are slidably connected with each other while facing each other.

2. Description of the Related Art

The term "portable terminals" in general refers to handheld devices that provide a mobile communication capability to users. As technology has progressed, portable terminals have gone beyond merely being mobile communication devices. More recently, portable terminals are becoming integrated devices that provide multimedia functions, such as playing back music files, moving picture files, and the like with financial service functions, such as making a micro payment using the portable terminal, providing general banking services, and the like.

Such portable terminals may be classified into a bar-type, a flip-type and a folder-type according to their appearance. Sliding-type terminals have recently appeared and are currently commanding a majority of the market of portable terminals, together with the folder-type terminals.

The bar-type terminal includes a single housing having input/output units such as a keypad and a transmitter, a display device, and a receiver arranged therein. The bar-type terminal has an advantage that it is simple because all components for the mobile communication function are arranged in the single housing. However, the bar-type portable terminal has a limitation on compactness because the terminal should be designed to sufficiently space the transmitter and the receiver from each other for voice call.

The flip-type terminal includes a bar type body and a flip cover pivotally connected to the body. The flip cover closes an input unit, such as a keypad, in a standby mode thereof, thereby preventing the keypad from erroneously operating. Similar to the bar-type terminal, the flip-type terminal has a limitation on compactness due to the distance between the transmitter and the receiver.

The folder-type terminal includes a pair of housings which are foldably connected together. In the folder-type terminal, input units and output units are respectively arranged in each housing whereby the folder-type terminal has a beneficial advantage on compactness as well as ensuring the distance between a transmitter and a receiver thereof. Therefore, the folder-type terminal has held a majority of the portable terminal market share for some time.

The sliding-type terminal includes a pair of housings which are slidingly connected to each other. In the sliding-type terminal, input units and output units are respectively arranged in each housing and a keypad of the input units is opened/closed according to the sliding movement of the housings. Such an arrangement prevents erroneous operation of the keypad, provides convenient use and provides a beneficial advantage on compactness. For these reasons, the sliding-type terminal has gradually made inroads into the portable terminal market and is occupying a higher market share than the folder-type terminal.

Korean patent No. 484,732, dated Apr. 13, 2005 (and corresponding U.S. Pat. No. 6,822,871, issued Nov. 23, 2004) granted to the applicant discloses various types of such sliding-type portable terminals.

Such a sliding-type portable terminal is provided with an elastic member in order to provide convenience for opening and closing the terminal. However, use of the elastic member in the sliding-type portable terminal creates a difficult problem in that the availability of necessary space for the elastic member must be ensured while at the same time ensuring wiring paths for flexible printed circuits.

For the purpose of ensuring the space of the elastic member and the flexible printed circuits, various types of modified elastic members have been disclosed. For example, an elastic member including a pair of coils received in a housing and free ends extending from the coils has been proposed. Such an elastic member efficiently utilizes the small space but has a higher manufacturing cost for the pair of coils and the housing to receive the free ends of the coils which in turn results in a higher cost of the terminal.

Further, the conventional sliding-type portable terminal has a sliding module that is a separate unit requiring a complex assembling process, which increases the time and cost needed to manufacture the module. Also, the conventional sliding-type portable terminal has a limitation on compactness because the module has a layered structure consisting of a number of parts.

SUMMARY OF THE INVENTION

An aspect of the present invention is to address at least the above-mentioned problems and/or disadvantages occurring in the prior art and to provide at least the advantages as described below. Accordingly, an aspect of the present invention is to provide a sliding-type portable terminal which allows an assembling space for an elastic member and a flexible printed circuit to be easily ensured.

Another aspect of, the present invention is to provide a sliding-type portable terminal which allows for a reduced manufacturing cost thereof while ensuring an assembling space for an elastic member and a flexible printed circuit.

Yet another aspect of the present invention is to provide a sliding-type portable terminal, which allows a reduced manufacturing cost by reducing time and the number of parts necessary for assembling thereof and has a slimmed structure.

In accordance with an aspect of the present invention, a sliding-type portable terminal is provided. The terminal includes a first housing, a second housing sliding in a longitudinal direction of the first housing while facing the first housing and an elastic member including a helical coil and a pair of free ends. The free ends extend from the coil in a direction away from each other and the elastic member providing elastic force in a direction to move the free ends away from each other, wherein the coil is interposed between the first housing and the second housing, an end of one of the free ends is rotatably supported on a first face of the first housing, and another of the free ends is extended toward the inside of the second housing and rotatably supported on an inner surface of the second housing.

In accordance with another aspect of the present invention, another sliding-type portable terminal is provided. The terminal includes a first housing and a second housing mounted to the first housing while facing the first housing. The second housing slides in a longitudinal direction of the first housing to either open or close the first housing, wherein the second housing includes a front case and a rear cover, the rear case being mounted to a rear surface of the front case, so that the rear case closes the rear case, and wherein the first housing includes at least one pair of sliding guides mounted on a front face thereof, the sliding guides being in engagement with the rear cover and guiding sliding movement of the second housing.

In accordance with still another aspect of the present invention, a sliding-type portable terminal is provided. The terminal includes a first housing, a second housing sliding in a longitudinal direction of the first housing while facing the first housing and an elastic member including a helical coil and a pair of free ends. The free ends extend from the coil in a direction away from each other and the elastic member providing elastic force in a direction to move the free ends away from each other, wherein the coil is interposed between the first housing and the second housing, an end of one of the free ends is rotatably supported on a first face of the second housing, and another of the free ends is extended toward the inside of the first housing and rotatably supported on an inner surface of the first housing.

BRIEF DESCRIPTION OF THE DRAWINGS

The above and other aspects, features and advantages of exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of the exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
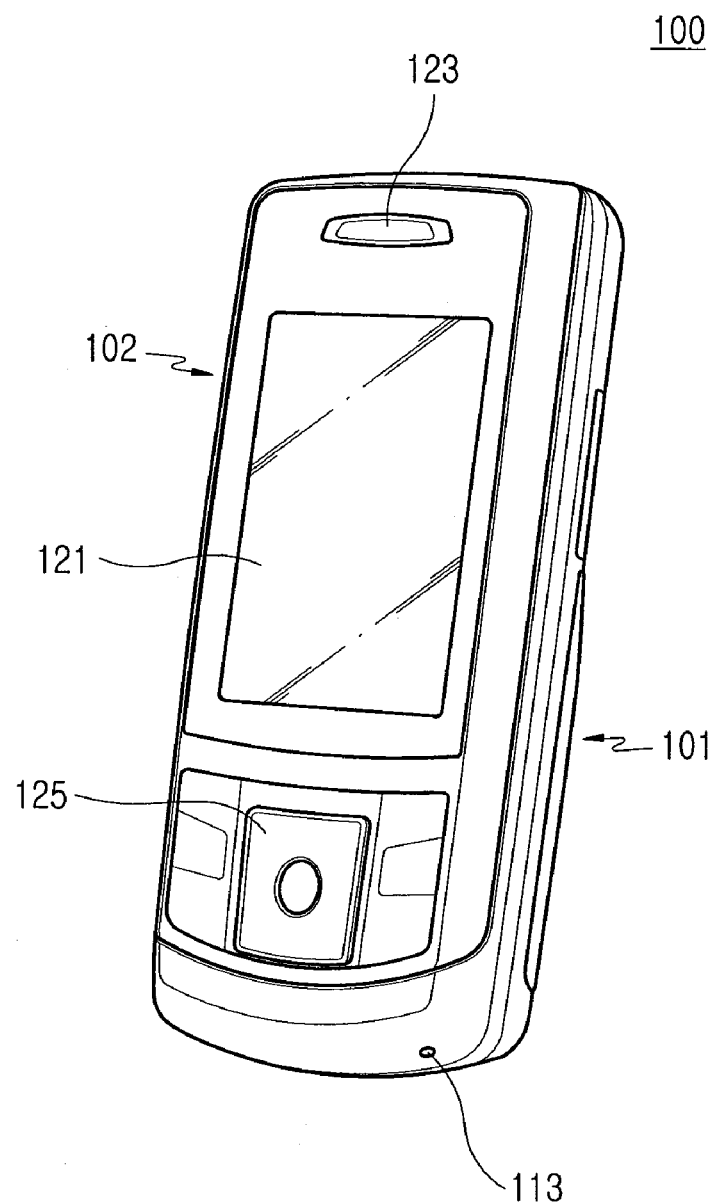
FIG. 1 is a perspective view illustrating a sliding-type portable terminal according to an exemplary embodiment of the present invention.
Figure 2:
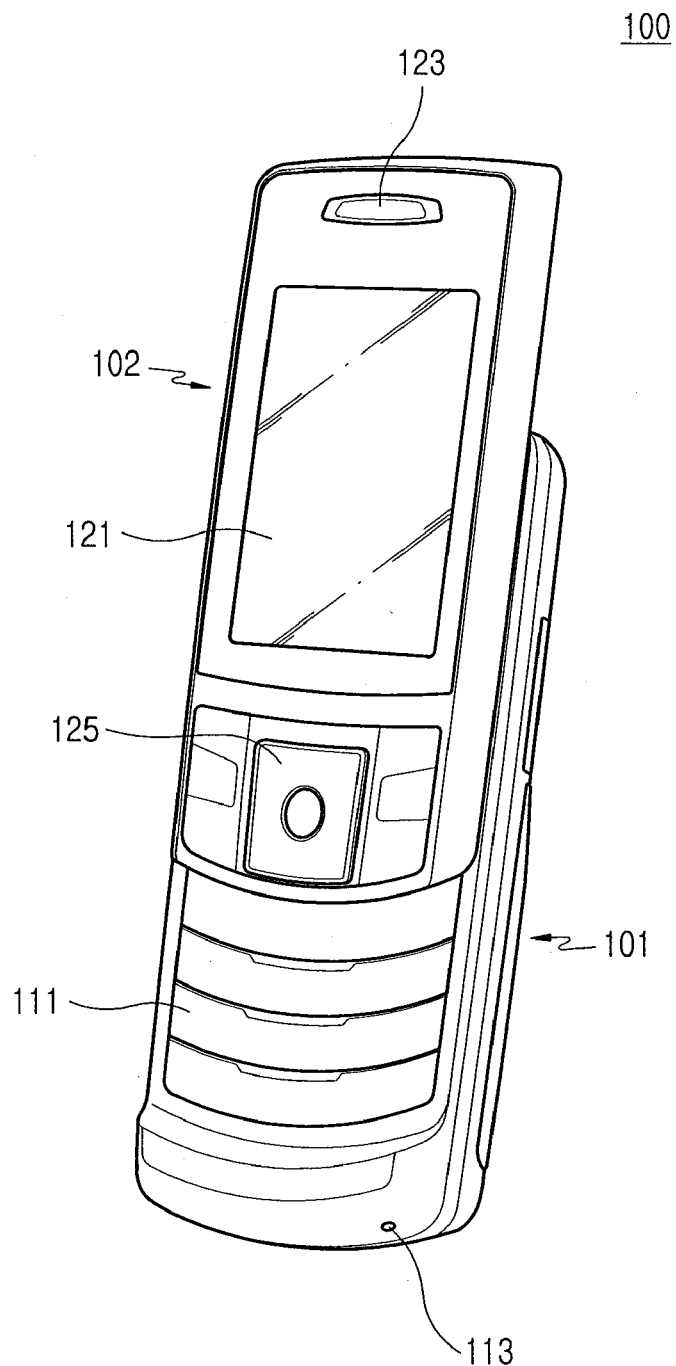
FIG. 2 is a perspective view illustrating the portable terminal of FIG. 1, in an opened state of a first housing.

As illustrated in FIGS. 1 and 2, a sliding-type portable terminal 100 according to an exemplary embodiment of the present invention includes a first housing 101 and a second housing 102. The second housing 102 is connected with the first housing 101 while facing the first housing 101 and slides on the first housing 101 in a longitudinal direction of the first housing 101. A part of a first face of the first housing 101 is either opened or closed by the sliding of the second housing 102.

The first housing 101 includes a keypad 111 arranged on the first face thereof. A transmitting unit 113 is disposed at one side of the keypad 111. The keypad 111 is either opened or closed by the sliding of the second housing 102. Namely, the keypad 111 is disposed at the part of the first face of the first housing 101 which is opened and closed by the second housing 102. The keypad 111 is generally used to input numerals and characters. The first housing 101 may also have a memory slot, an interface connector, a volume control key, and the like, which are appropriately dispersed in both side surfaces thereof and a lower end surface thereof.

A display device 121 is disposed on the first face of the second housing 102. On the second housing 102, a receiving unit 123 is disposed above the display device 121 and a functional keypad 125 is disposed below the display device 121. The display device 121 outputs status information of the terminal 100, received messages, photographed pictures, stored information in the terminal, and the like, on the screen. The receiving unit 123 outputs sound information. The functional keypad 125 includes call start/end keys, a navigation key, a menu display key, a selection/cancel key and the like and is thus used to select and activate functions of the terminal 100 itself.

As shown in FIG. 1, while the second housing 102 is closed on the first housing 101, the user can still manipulate the functional keypad 125. As such, the user can play games and output received messages and information stored in the terminal 100 through the display device 121 or the receiving unit 123. Namely, even though the first housing is closed, the terminal 100 can be utilized as a multimedia device, such as playing back music files or moving picture files.

As shown in FIG. 2, while the first housing 101 is opened, the user can freely manipulate the keypad 111. Since the keypad 111 is used to input numerals, characters, and the like, the user can use it to call someone for a voice call, to make a voice call, to edit/send short text messages, to edit long letters messages or documents and the like.

Figure 3:
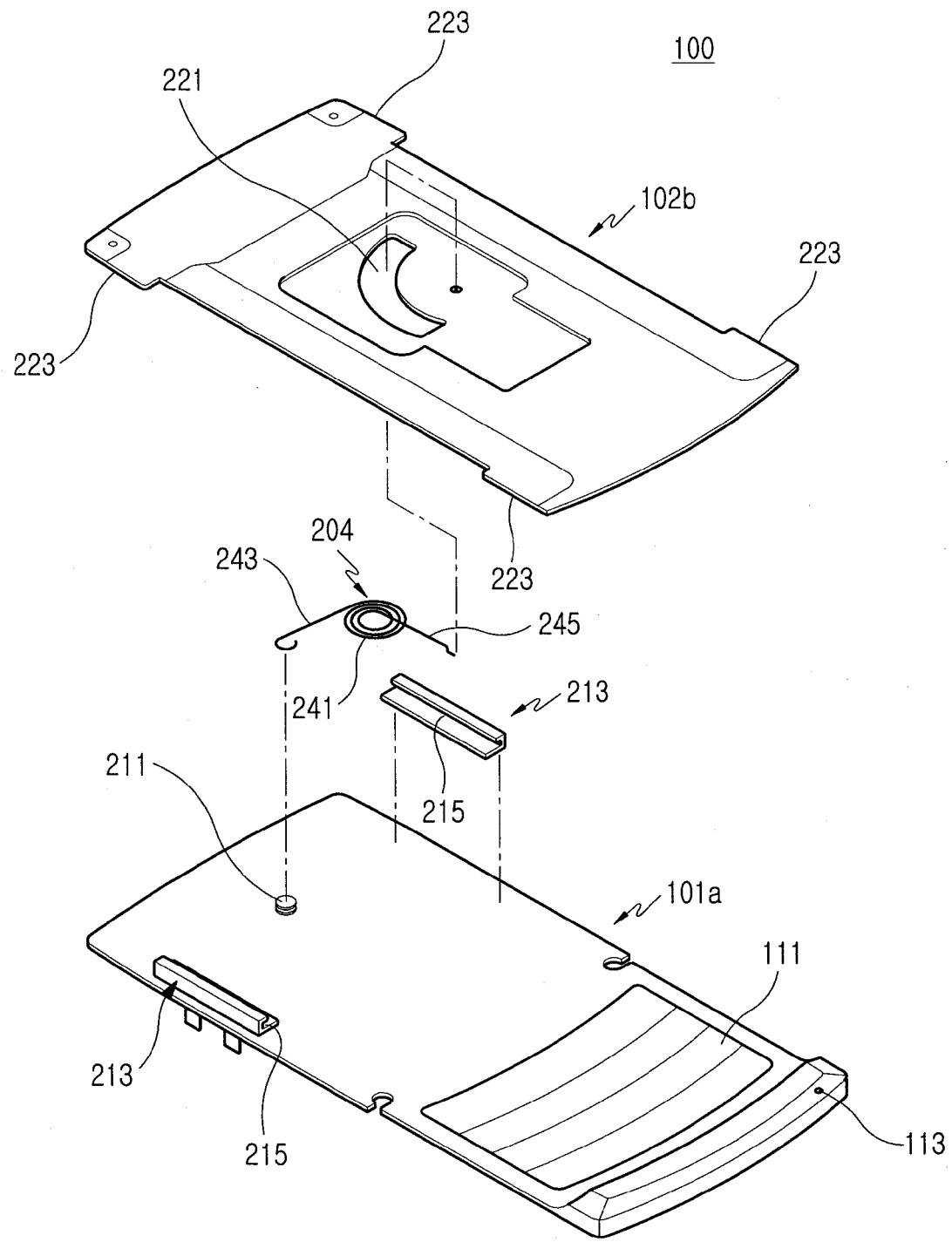
FIG. 3 is an exploded perspective view illustrating a part of the portable terminal of FIG. 1.

Referring to FIG. 3, the first and second housings 101 and 102 are slidably connected to each other through a pair of guide members 213 mounted to the first housing 101. However, while an exemplary embodiment explains the guide members 213 as an element for connecting the first housing 101 and the second housings 102 to each other, it is apparent to one skilled in the art that it is also possible to use various other structures different from the guide member 213, which can slidably connect the first and second housings 101 and 102 to each other.

It is noted that FIGS. 3 to 6 are views for illustrating an exemplary connecting structure of the first housings 101 and the second housing 102 and an opening and closing operation of the terminal 100 and thus show only a front case 101a of the first housing 101 and a rear case 102b of the second housing 102.

A terminal 100 is provided with the guide members 213 to connect the first housing 101 and the second housing 102 to each other and an elastic member 204 to generate a driving force to move the second housing 102.

The guide members 213 are disposed at an upper portion of the first face of the first housing 101 and thus maintained to be closed by the second housing 102. Each of the guide members 213 is disposed at a respective side edge on the first face of the first housing 101.

Each of the guide members 213 has a respective sliding groove 215 formed therein. Each of the sliding grooves 215 surrounds a respective side edge of the rear case 102b of the second housing 102. Namely, the guide members 213 are connected with the rear case 102b of the second housing 102 in such a manner that each of the guide members 213 surrounds a side edge of the rear case 102b of the second housing 102 while being mounted to the first housing 101. As a result, the second housing 102 slides on the first housing 101 while being supported by the guide members 213.

Stopper ribs 223 are formed at upper ends and lower ends of both sides of the rear case 102b, respectively. The stopper ribs 223 make contact with the guide members 213 when the second housing 102 slides, thereby defining a movement range of the second housing 102.

The elastic member 204 is supported at its one end in the first housing 101 and at its another end in the second housing 102. The elastic member 204 provides elastic force acting in a manner to move both of its ends away from each other. Hereinafter, the one end of the elastic member 204, which is supported in the first housing 101, will be referred to as a "first free end" 243 and the another end of the elastic member 204, which is supported in the second housing 102, will be referred to as a "second free end" 245.

The elastic member 204 accumulates elastic force using a helical coil 241. The first and second free ends 243 and 245 extend in a direction away from each other. The elastic member 204 also provides elastic force acting in a direction to move the first free end 243 and the second free end 245 away from each other.

The elastic member 204, specifically the helical coil 241, is interposed between the front case 101a of the first housing 101 and the rear case 102b of the second housing 102. In an exemplary embodiment, the first free end 243 is rotatably supported by a supporting post 211 formed on the first housing 101. In an alternative embodiment, the first free end 243 is rotatably supported by a supporting hole formed in the first housing 101. The second free end 245 extends from the helical coil 241 toward the inside of the second housing 102. The end of the second free end 245 is rotatably supported on an inner surface of the second housing 102.

A guide hole 221 is formed in the second housing 102, specifically on the rear case 102b of the second housing 102, thereby providing a path in which the second free end 245 extends and a path in which the coil 241 can move.

Namely, the second free end 245 extends through the guide hole 221 and toward the inside of the second housing 102. The end of the second free end 245 is rotatably supported on the inner surface of the second housing 102. The guide hole 221 provides a path in which the coil 241 and the second free end 245 can move while the second housing 102 slides.

The guide hole 221 may have a circular arc shape of which a radius is the same as the length of the second free end 245. Namely, when the second housing 102 slides, the second free end 245 rotates about its end supported on the inner surface of the second housing 102 and the coil 241 rotates about the end of the second free end 245.

Consequently, when the second housing 102 has been connected to the first housing 101 and the elastic member 204 has been assembled, the coil 241 is located on the guide hole 221, and thus the coil 241 moves along a trace of the guide hole 221 when the second housing 102 slides.

At this time, since the second free end 245 overlaps with the coil 241, if the second free end 245 is interposed between the first housing 101 and the second housing 102, the thickness of the terminal will increase as much as the diameter of the second free end 245. However, the sliding-type portable terminal according to an exemplary embodiment of the present invention allows the second free end 245 to be assembled in the terminal without increasing the thickness of the terminal because the second free end 245 is located within the second housing 102.

Figure 4:
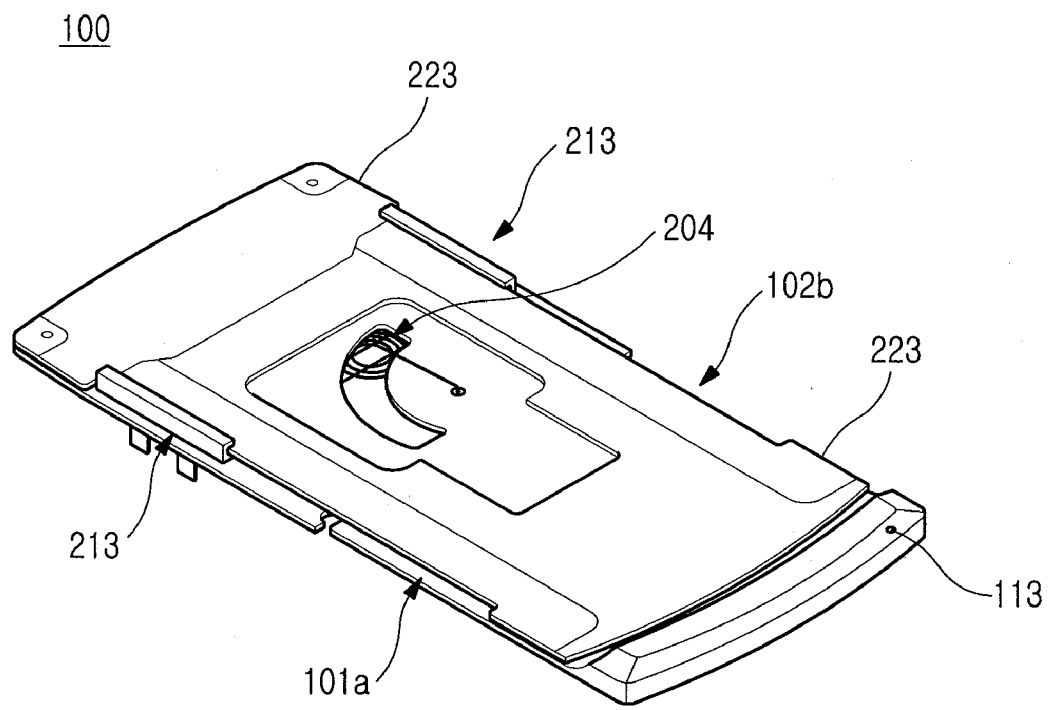
FIG. 4 is a view illustrating a part of the portable terminal of FIG. 1 in a closed state of the first housing.
Figure 5:
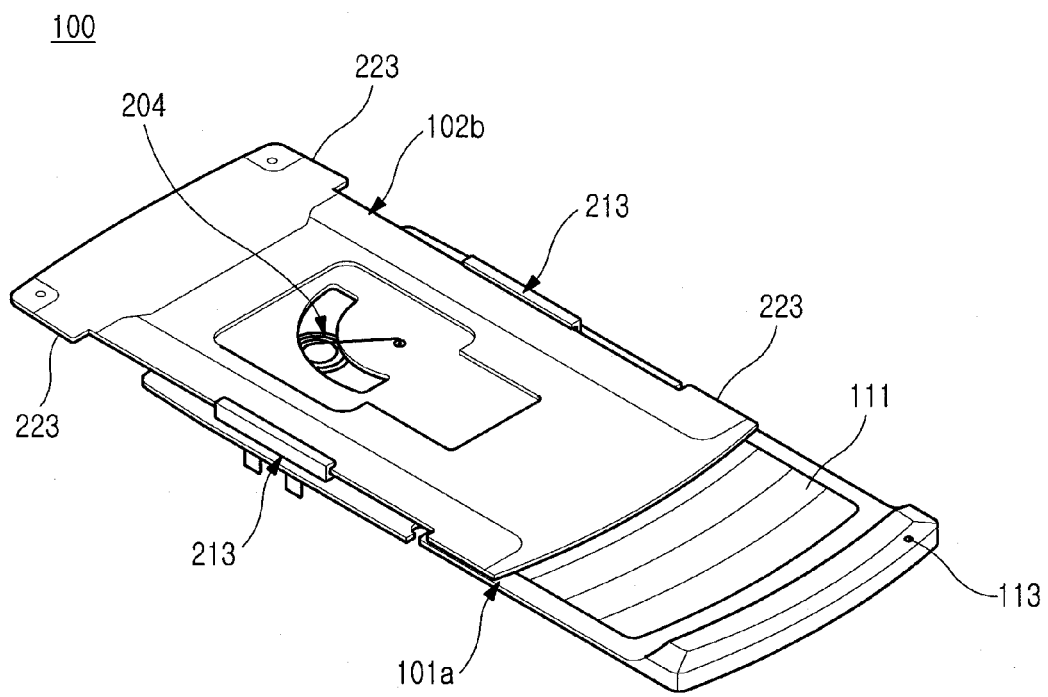
FIG. 5 is a view illustrating a part of the portable terminal of FIG. 1 in a sliding movement of a second housing.
Figure 6:
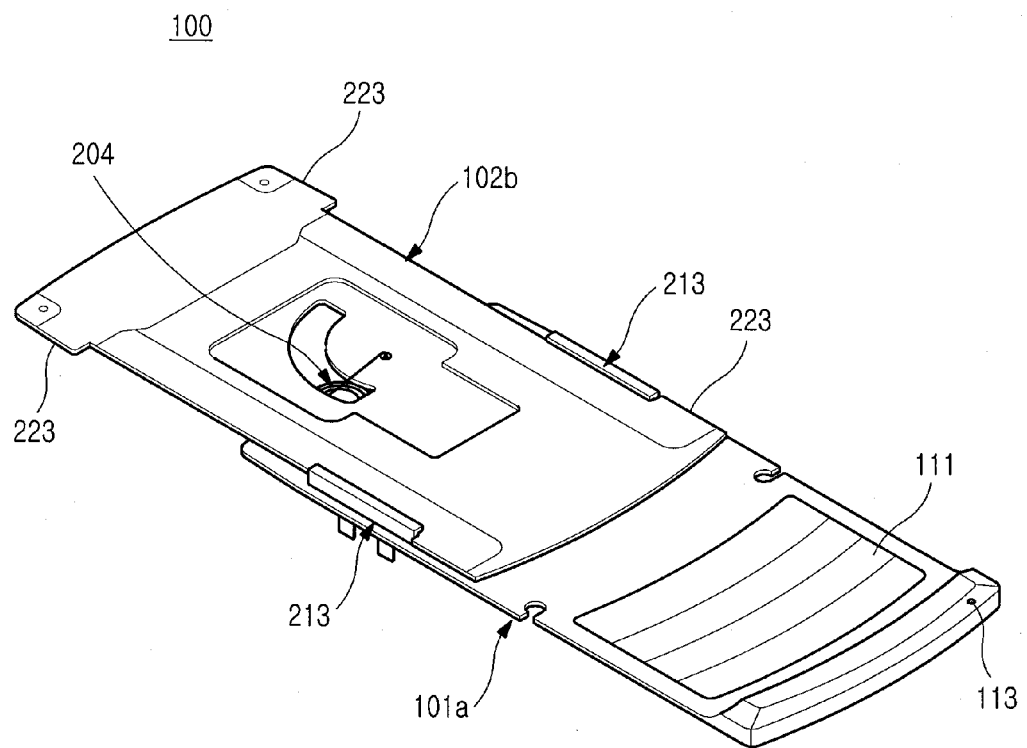
FIG. 6 is a view illustrating a part of the portable terminal of FIG. 1 in an opened state of the first housing.

FIGS. 4 to 6 sequentially illustrate processes of the sliding operation of the second housing, in which the second housing 102 slides from a closed state of the first housing 101 to an opened state of the first housing 101 to open the keypad 111. Hereinafter, the opening/closing operation of the terminal 100 will be explained with reference to FIGS. 4 to 6.

FIG. 4 corresponds to FIG. 1, in which the first face of the first housing 101 is completely closed. In the completely closed-state of the first face of the first housing 101, the first free end 243 of the elastic member 204 is located relatively above the second free end 245 and the elastic member 204 provides elastic force to move the second housing 102 downward. At this time, the second housing 102 can not move downward any more because the guide members 213 are blocked by the stopper ribs 223 located at the upper ends of the second housing 102. Therefore, the second housing 102 can be maintained in the stable stationary state while closing the first housing 101.

As shown in FIG. 5, when the second housing 102 gradually moves upward to open the first face of the first housing 101, the second free end 245 moves upward together to gradually approach the first free end 243. Therefore, the elastic force accumulated in the elastic member 204 is gradually increased, and the elastic force at this time acts as driving force to move the second housing 102 downward.

When the second housing 102 continues to move upward so as to go beyond a point at which the first free end 243 and the second free end 245 most closely approach each other, the elastic force accumulated in the elastic member 204 is converted into a driving force to move the second housing 102 upward.

FIG. 6 shows an opened state of the keypad 111 of the first housing 101 by the upward movement of the second housing 102, which corresponds to FIG. 2. When the guide members 213 are blocked by the stopper ribs 223 located at the lower ends of the second housing 102 while the second housing 102 is moving upward, the second housing 102 can not move upward any more and thus is stopped. At this time, the elastic member 204 still provides the elastic force to move the second housing 102 upward, and therefore, the second housing 102 can be maintained in the stable stationary state while opening the keypad 111.

Consequently, the point at which the first free end 243 and the second free end 245 most closely approach each other exists within the sliding movement range of the second housing 102. Between a point at which the keypad 111 is closed and the point at which the first free end 243 and the second free end 245 most closely approach each other, the driving force to move the second housing 102 in the direction to close the keypad 111 is generated, and between a point at which the keypad 111 is opened and the point at which the first free end 243 and the second free end 245 most closely approach each other, the driving force to move the second housing 102 in the direction to open the keypad 111 is generated.

Accordingly, once the user moves the second housing upward only in a part of the entire range of the sliding movement of the second housing in order to open the keypad 111, then the second housing 102 is moved upward by the elastic force of the elastic member 204 in the rest of the way. Similarly, once the user moves the second housing 102 downward in a part of the entire range of the sliding movement of the second housing 102 in order to close the keypad 111, then the second housing 102 is moved downward by the elastic force of the elastic member 204 in the rest of the way.

As described above, the sliding-type portable terminal according to an exemplary embodiment of the present invention has an advantage in that it is easy to reduce a thickness thereof because the terminal is provided with the elastic member which includes the coil and a pair of free ends extending from the coil, one of which is disposed within one of the housings of the terminal. Furthermore, since the opening/closing operation is performed by using the single elastic member, the space required for the installation and operation of the elastic member can be reduced, which in turn allows a space for installing a flexible printed circuit to be increased.

In addition, since the semi-auto opening/closing operation can be achieved by using the elastic member including the single coil and free ends extending from the coil, the manufacturing cost of the elastic member is reduced, which ultimately results in the reduction of the manufacturing cost for the terminal.

Figure 7:
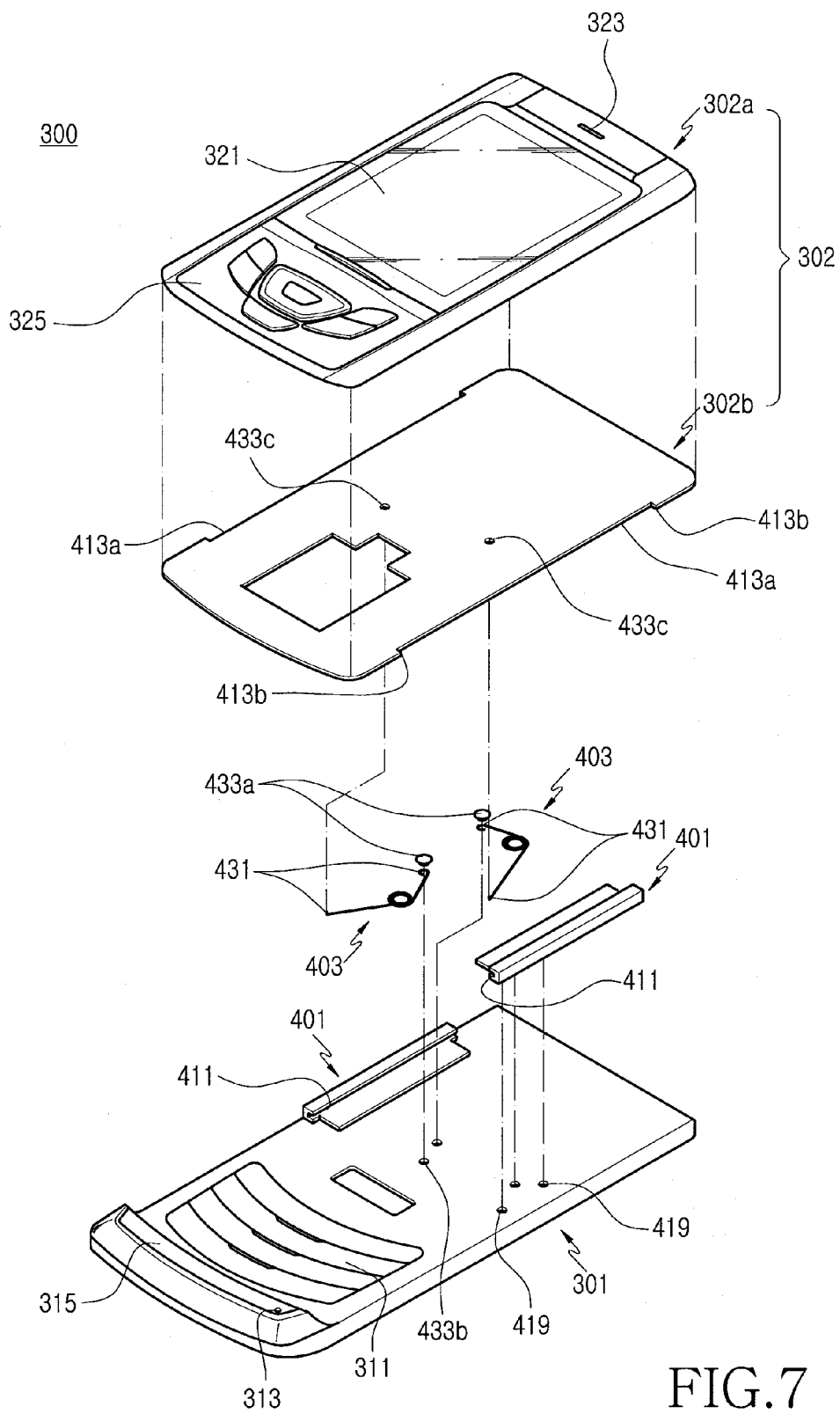
FIG. 7 is an exploded perspective view illustrating a sliding-type portable terminal according to an exemplary embodiment of the present invention.

FIG. 7 is an exploded perspective view of a sliding-type portable terminal 300 according to an exemplary embodiment of the present invention. As shown in FIG. 7, the sliding-type portable terminal 300 includes a first housing 301, a second housing 302 which is connected to the first housing while facing the first housing 301 and slides in a longitudinal direction of the first housing 301, and sliding guides 401 for connecting the first and second housing 301 and 302 to each other. When the second housing 302 slides, a part of the first housing 301 is either opened or closed.

The first housing 301 is provided with a keypad 311 formed on the first face thereof, a protrusion 315 formed at one end thereof, and a transmitting unit 313 formed in the protrusion 315. The protrusion 315 is disposed adjacent to the keypad 311 and is located higher than the keypad 311. The keypad 311 is disposed in a lower half area of the first face of the first housing 301 and is either opened or closed according to sliding movement of the second housing 302.

The sliding guides 401 are mounted in an upper half area of the first face of the first housing 301. In an exemplary embodiment, a pair of sliding guides 401 are provided, each disposed in and fixed to the first housing 301, and adjacent to each end of both sides of the first housing 301, so that they face each other. On surfaces of the sliding guides 401 in which the surfaces face each other, there are formed sliding grooves 411, respectively, which extend in a longitudinal direction of the first housing 301.

The sliding guides 401 may be manufactured by an insert injection using metal members having screw holes (not shown) formed therein and synthetic resin. The screw holes of the metal members are used for mounting the sliding guides 401 on a front face of the first housing 301. The sliding grooves 411 are formed in portions made of the synthetic resin and are in sliding contact with a rear cover 302b of the second housing 302.

The metal members are each exposed through each of bottom surfaces of the sliding guides 401. The screw holes of the metal members are not shown in FIG. 7. There are formed connecting holes 419 on the upper half area of the upper face of the first housing 301, which correspond to the screw holes of the sliding guides 401. Consequently, the sliding guides 401 are fixed to the first housing 301 by screws in an exemplary embodiment. In an exemplary embodiment, the upper face of the first housing 301 is manufactured with some metallic material so as to be rigidly connected with the sliding guide 401.

The second housing 302 includes a front case 302a and a rear cover 302b. The front case 302a provides a face exposed to the outside of the portable terminal 300 and has a display device 321, a functional keypad 325, and a receiving unit 323 arranged therein. The functional keypad 325 may control the display of a menu, searching for stored information, connecting to a wireless internet, and the like.

The rear cover 302b is provided with sliding ribs 413a respectively provided at ends of both sides thereof, and stoppers 413b respectively provided at both ends of the sliding ribs 413a. The sliding ribs 413a extend in a longitudinal direction of the second housing 302, specifically the rear cover 302b and are each in engagement with and in sliding contact with each of the sliding grooves 411. The rear cover 302b is mounted to a rear face of the front case 302a to close the front case 302a. At this time, the stoppers 413b, which protrude toward the outside relatively more than the sliding ribs 413a, are aligned with an inner surface of the front case 302a. Therefore, there is formed, between the sliding ribs 413a and the inner surface of the front case 302a, a space where the sliding guides 401 can be located.

When the sliding ribs 413a slide while being in engagement with the sliding grooves 411, the sliding guides 401 are blocked by the stoppers 413b because the stoppers 413b protrude toward the outside more than the sliding ribs 413a. Therefore, the movement range of the rear cover 302b, in which the rear cover 302b slides while being guided by the sliding guides 401, is defined by the stoppers 413b.

When the rear cover 302b, specifically the sliding ribs 413a, has been in engagement with the sliding grooves 411, a part of each of the sliding guides 401 is located on an inside surface of the rear cover 302b and the remaining part of each of the sliding guides 401 is located on an outside surface of the rear cover 302b, so that the rear cover 302b is mounted to the first housing 301. Then, the sliding guides 401 are located in the space between the sliding ribs 413a and the inner surface of the front case 302a, by which the second housing 302 slides in the longitudinal direction of the first housing 301 while being guided by the sliding guides 401.

In an exemplary embodiment, the rear cover 302b is made of a metallic material. For example, the rear cover 302b is manufactured with some metallic material and then the sliding guides 401 may be manufactured with some synthetic resin accommodating a metal member by using insert injection, by which high structural stability of the terminal 300 can be obtained. Namely, this configuration can prevent damage and breakage of the sliding guides 401 and the rear cover 302b due to impacts from dropping, and external forces applied to the second housing 302 in a direction different from the movement direction of the second housing 302, for example.

Also, since the sliding guides 401 may be manufactured in such a manner that the metal member is surrounded by the synthetic resin material, rubbing of the rear cover 302b of the metallic material with the metal member of the sliding guides 401 can be prevented. Consequently, since the sliding guides 401 are manufactured by insert injection in which the metal member is surrounded by the synthetic resin, direct rubbing of the rear cover 302b of the metallic material with the metal member of the sliding guides 401, which would generate frictional sounds, is prevented.

The metallic material for manufacturing either the rear cover 302b or the first housing 301 may be Stainless Steel (SS), for example. The synthetic resin for forming the sliding guides 401 may be polyoxymethylene (POM), for example.

Meanwhile, the terminal 300 may have at least one elastic member 403 providing driving force for the movement of the second housing 302.

In an exemplary embodiment, the at least one elastic member 403 is a torsion spring which includes a coil and a pair of free ends 431 respectively extending from both ends of the coil in a direction away from each other. The free ends 431 are respectively supported in the first housing 301 and the second housing 302. A pair of elastic members 403 may be interposed between the first housing 301 and the second housing 302 so as to provide the driving force according to the movement of the second housing 302. Each of the elastic members 403 accumulates elastic force acting in a direction to move the free ends 431 away from each other on the terminal 300.

To support the free ends 431 of the elastic members 403, the first housing 301 is provided with first support holes 433b and rivets 433a, and the second housing 302, specifically to the rear cover 302b is provided with second support hole 433c. The rivets 433a are fixed to the first housing 301 through the support holes 433b. Then, one of the free ends 431 of each the elastic member 403 is connected to one of the rivets 433a in a manner that its end surrounds a circumferential surface of the one of the rivets 433a. Another of the free ends 431 of each of the elastic members 403 has its end which bends and is supported at one of the second support holes 433c. When the second housing 302 slides, the free ends 431 turn about the rivets 433a and the support holes 433b, respectively.

While the second housing 302 is sliding on the first housing 301, the free ends 431 of each the elastic members 403 either approach each other or move away from each other. A point at which the free ends 431 of each of the elastic members 403 most closely approach each other exists within the sliding movement range of the second housing 302.

At the position in which the second housing 302 completely closes the first housing 301, the free ends 431 of each of the elastic members 403 are farthest from each other on the terminal 300. Therefore, the elastic force accumulated in each of the elastic members 403 is a minimum. When the second housing 302 gradually slides, the free ends 431 of each of the elastic members gradually approach each other to accumulate the elastic force thereof. Then, the elastic force accumulated when the free ends 431 approach each other acts as driving force to move the second housing 302 toward a position at which the second housing 302 had been first located.

When the second housing 302 further moves to be located at the point that the free ends 431 of each of the elastic members 403 most closely approach each other, each of the elastic members 403 accumulates a maximum elastic force. Then, the elastic force accumulated in the elastic members 403 is in an unbiased state in which the elastic force does not act in any direction.

When the second housing 302 further moves from the point at which the free ends 431 have most closely approached each other, the elastic force accumulated in the elastic members 403 act in the movement direction of the second housing 302.

In conclusion, with reference to the closest approaching point that the free ends 431 most closely approach each other, the elastic force to be accumulated in the elastic members 403 acts in the direction to move the second housing 302 to close the first housing 301 at one side of the closest approaching point and in the direction to move the second housing 302 to open the first housing 301 at another side of the closest approaching point.

When the second housing 302 moves in the direction to close the first housing 301 from the position that the second housing 302 has opened the first housing 301, the elastic members 403 provide the driving force acting in the direction to open the first housing 301 between the opened position of the first housing 301 and the closest approaching point, and when the second housing 302 moves beyond the closest approaching point, the elastic members 403 provide the driving force acting in the direction to close the first housing 301.

Figure 8:
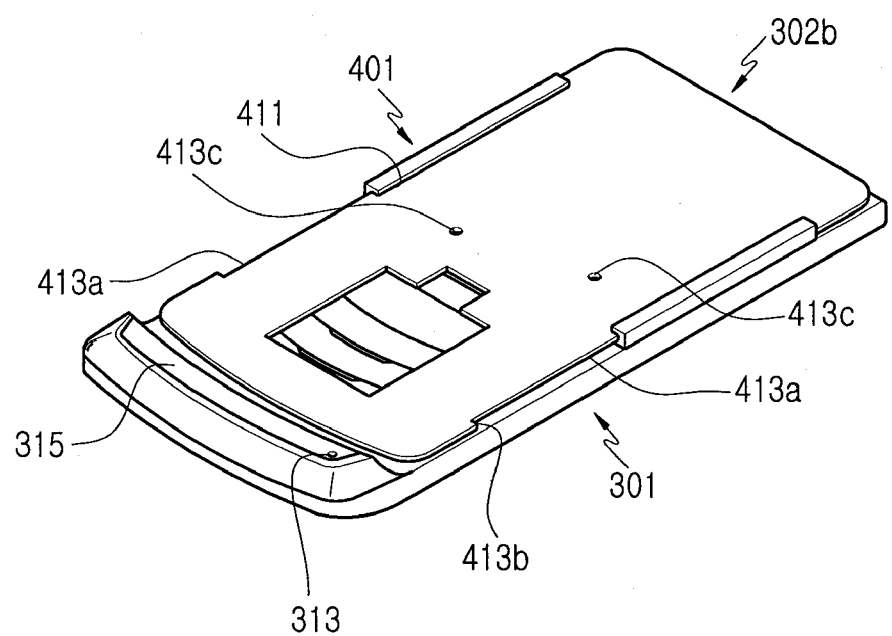
FIG. 8 is a view illustrating a part of the portable terminal of FIG. 7 in a closed state of a first housing.
Figure 9:
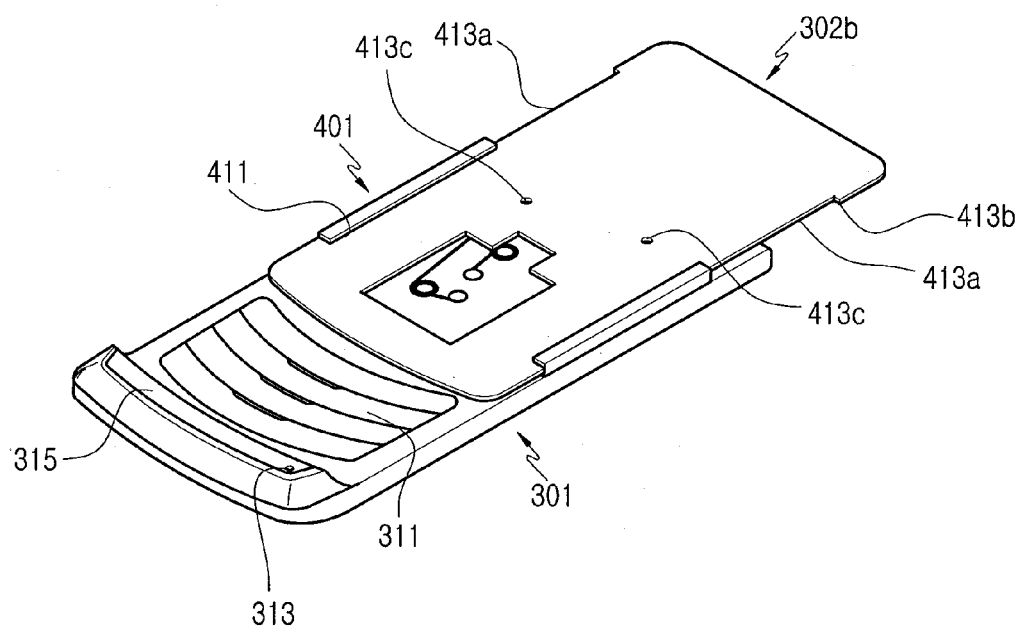
FIG. 9 is a view illustrating a part of the portable terminal of FIG. 7 in an opened state of the first housing.
Figure 10:
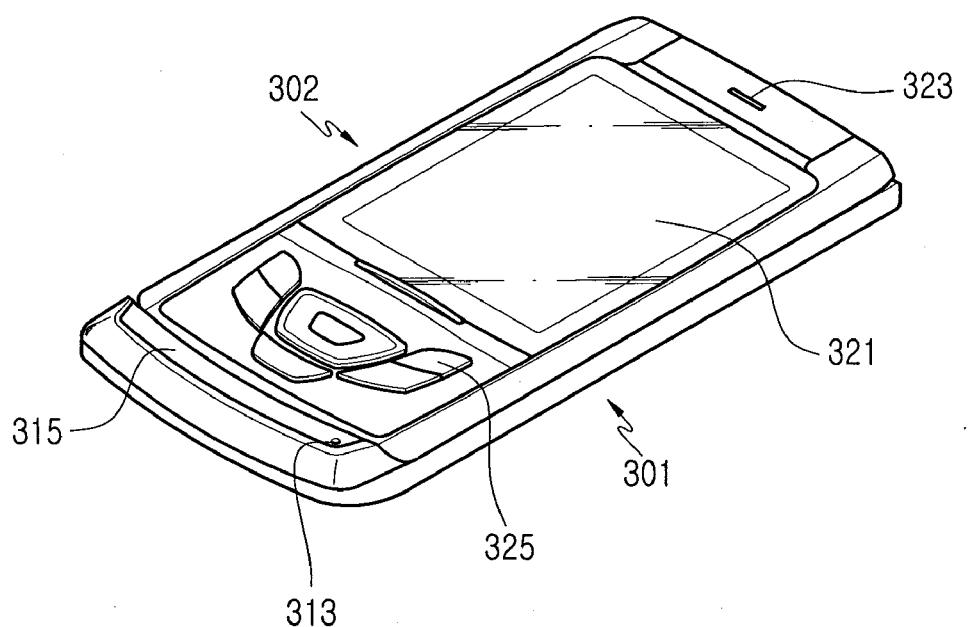
FIG. 10 is an assembled perspective view illustrating the portable terminal of FIG. 7.
Figure 11:
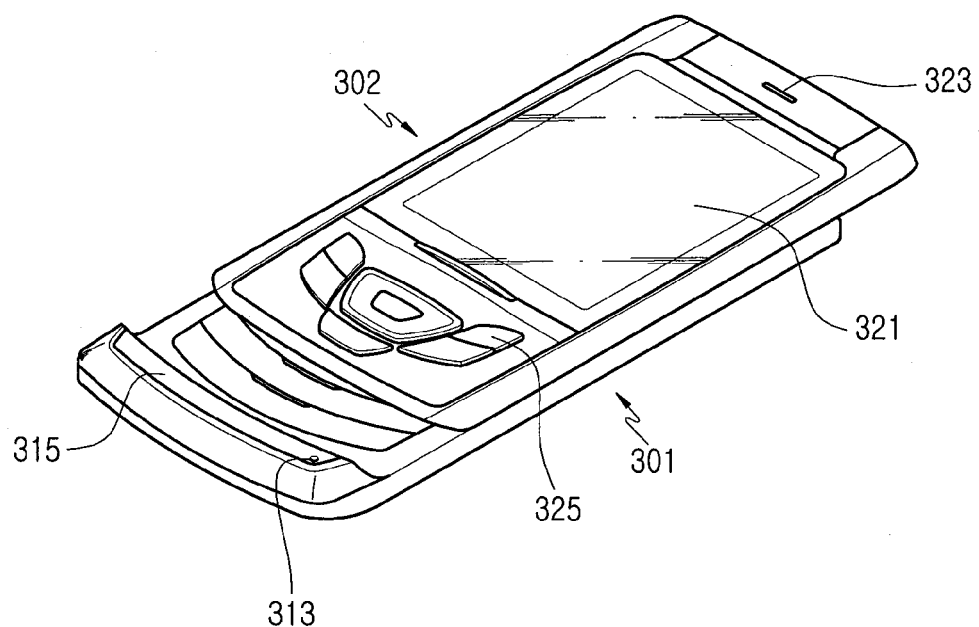
FIG. 11 is a perspective view illustrating the portable terminal of FIG. 10 in a sliding movement of the second housing.
Figure 12:
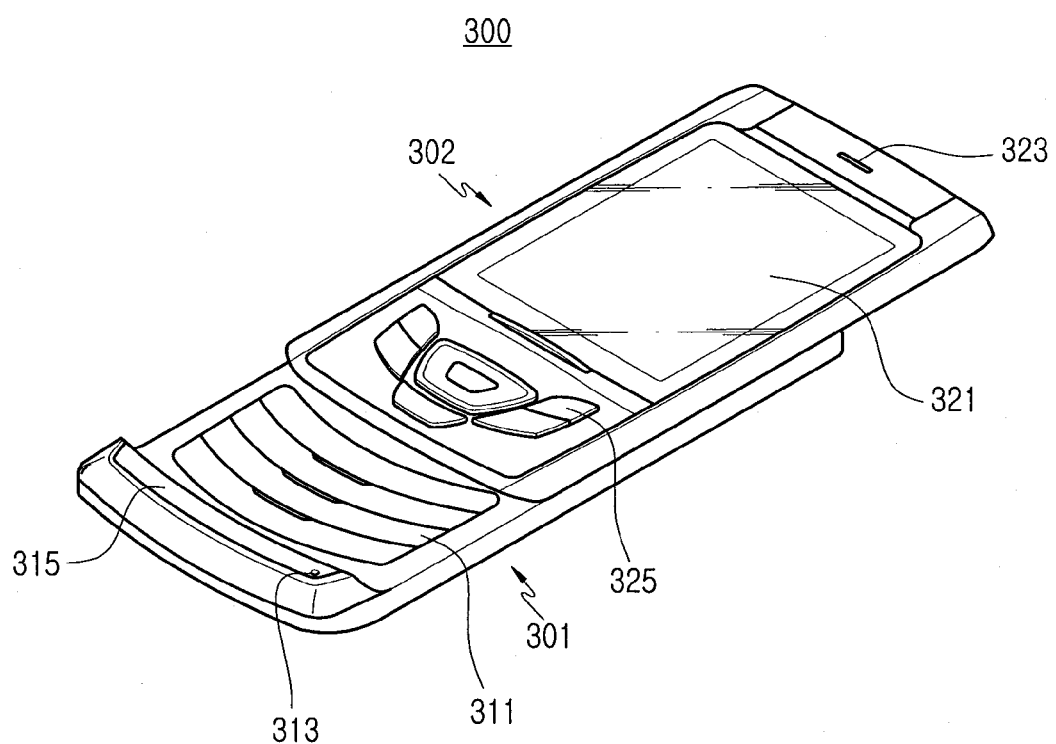
FIG. 12 is a perspective view illustrating the portable terminal of FIG. 10 in an opened state of the first housing.

FIGS. 8 and 9 show a part of a terminal, in which FIG. 8 illustrates a closed state of the first housing 301 and FIG. 9 illustrates an opened state of the first housing 301. FIGS. 10 to 12 are views for sequentially illustrating an opening process of the first housing 301.

Referring to FIGS. 8 and 10, when the second housing 302 is closing the keypad 311 of the first housing 301, the stoppers 413b of the one end of the rear cover 302b block the sliding guides 401 and at the same time the one end of the second housing 302 is in contact with the protrusion 315. Also, the elastic members 403, in spite of having a minimum elastic force accumulated therein, provide a driving force to move the second housing 302 toward the lower side of the first housing 301. Consequently, the second housing 302 is held by the elastic force of the elastic members 403, the protrusion 315, the sliding guides 401, and the stoppers 413b so that the second housing 302 can be stably maintained to close the first housing 301.

As shown in FIG. 11, if the user gradually moves the second housing 302 upward, the keypad 311 is gradually opened. When the second housing 302 is located between the closed position in which the second housing 302 closes the first housing 301 and the closest approaching point, the elastic members 403 provides a driving force to move the second housing 302 in the direction to close the first housing 301. Also, when the second housing 302 further moves to go beyond the closest approaching point, the elastic force of the elastic members 403 provides a driving force to move the second housing 302 in the direction to completely open the first housing 301.

Once the user moves the second housing 302 to go beyond the closest approaching point, the second housing 302 is moved by the elastic force of the elastic members so as to completely open the keypad 311 even though the user does not move the second housing 302 any more. Therefore, the user can conveniently open the keypad 311 although not moving the second housing 302 completely. FIGS. 9 and 12 illustrate an opened state of the first housing 301 in which the keypad 311 is completely opened.

When the second housing 302 is located between the position at which the keypad 311 is completely opened and the closest approaching point in the case of closing the keypad 311 again, the elastic members 403 provide a driving force acting in the direction to open the keypad 311. Also, when the second housing 302 is located between the closest approaching point and the position at which the keypad 311 is completely closed, the elastic members 403 provide the driving force acting in the direction to close the keypad 311.

Hereinafter, there will be explained a sliding-type portable terminal according to an exemplary embodiment of the present invention with reference to FIGS. 13 to 18. The sliding-type portable terminal according to an exemplary embodiment of the present invention includes housings having a configuration substantially the same as the housings of the aforementioned exemplary embodiments but has another connecting structure in the housings, which is somewhat different from the aforementioned embodiments. It is therefore noted that some components, which can be understood as substantially the same as that of the aforementioned exemplary embodiments, will be explained with reference to corresponding components of the aforementioned embodiments and reference numerals thereof.

The terminal includes the first housing 101 and the second housing 102, in which the housings 101 and 102 are slidably connected to each other. The first housing includes a front case 501 and a rear case. The second housing slides on the first housing, in which the second housing includes an upper case and a lower case 502.

Figure 13:
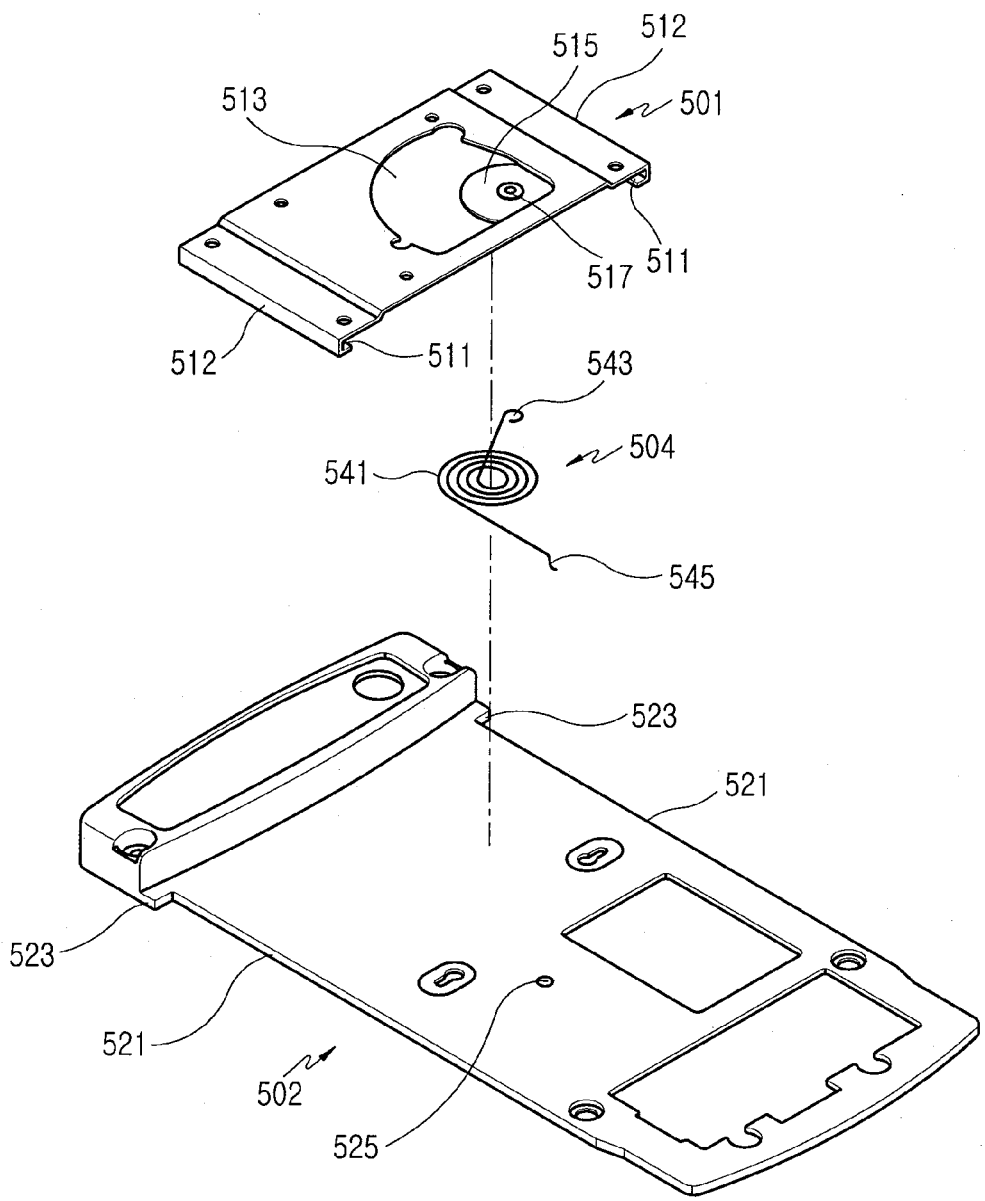
FIG. 13 is an exploded perspective view illustrating a part of a sliding-type portable terminal according to an exemplary embodiment of the present invention.

It is noted that FIG. 13 is a view for illustrating a connecting structure of the first housing 101 and the second housing 102, and therefore, FIG. 13 shows only the lower case 502 of the second housing 102 and the rear case 501 to be mounted to the first housing 101 in order to provide an understanding of the connecting structure clear. Although the front case 501 is shown as a separate member from the first housing 101, it may be configured to be integrated into the first housing 101.

In order to connect the first housing 101 and the second housing 102 to each other, guide rails 521 are respectively formed on both side ends of the lower case 502. Also, guide members 512, which are "⊂" shaped members, each having a sliding groove 511, are respectively provided at both side ends of the front case 501, so that the front case 501 is connected to the lower case 502 in such a manner that each the guide member 512 surrounds each guide rail 521.

The guide members 512 are respectively formed to be integrated into the front case 501 at both side ends of the front case 501. The front case 501 is to be mounted to the first housing 101, in which the guide members 512 are maintained to be always closed by the second housing 102.

Each of the guide members 512 is provided with the guide groove 511 on its inner side, by which the guide members 512 surround the guide rails 521 of both sides of the lower case 502 so as to guide the second housing 102 to stably slide on the first housing 101. Namely, the guide members 512 surround both side edges of the lower case 502 so as to be connected to the lower case 502 while mounted to the first housing 101, by which the second housing 102 slides on the first housing 101 while being supported by the guide members 512.

Stopper ribs 523 are respectively formed at both sides of an upper end of the lower case 502. The stopper ribs 523 block the guide members 512 while the second housing 102 is sliding, thereby defining the movement range of the second housing 102.

In order to provide a driving force to move the second housing 102, the terminal may be provided with at least one elastic member 504.

The elastic member 504 accumulates elastic force using a helical coil 541. The elastic member 504 has its one end rotatably supported in the first housing 101 and its another end rotatably supported in the second housing 102. The elastic member 504 provides elastic force to move both ends away from each other. Hereinafter, said one end of the elastic member 504, which is supported in the first housing 101, will be referred to as a "first free end" 543 and said another end of the elastic member 504, which is supported in the second housing 102, will be referred to as a "second free end" 545.

The coil 541 of the elastic member 504 is interposed between the front case 501 of the first housing 101 and the lower case 502 of the second housing 102. The first free end 543 of the elastic member 504 extends toward the inside of the first housing 101 through a guide hole 513 formed in the front case 501, and then is rotatably supported at a spring rivet 517 of a spring fixing plate 515, in which the spring fixing plate 515 is formed to be integrated with the front case 501. The second free end 545 extends from the coil 541 and then is rotatably supported at a spring rivet 525 of the lower case 502 of the second housing 102.

The guide hole 513 formed in the front case 501 provides a path through which the first free end 543 extends and a path in which the coil 541 can move while the second housing 102 is sliding.

The first free end 543 extends toward the inside of the first housing 101 through the guide hole 513 and has its end rotatably supported on an inner surface of the first housing 101. Also, the guide hole 513 provides the path in which the coil 541 and the first free end 543 can move while the second housing 102 is sliding.

Here, the guide hole 513 is formed having a circular arc shape, and the circular arc includes an area where the coil 541 passes through while moving. Namely, when the second housing 102 slides, the second free end 545 rotates about the spring rivet 517 supported on the inner surface of the second housing 102 and the coil 541 rotates about the end of the first free end 543.

Consequently, when the second housing 102 has been connected to the first housing 101 and the elastic member 504 has been assembled, the coil 541 is located on the guide hole 513. Then, the coil 541 moves in the guide hole 513 along the path of the guide hole 513 when the second housing 102 slides.

If the elastic member 504 is interposed between the first housing 101 and the second housing 102, the thickness of the terminal will increase because the helical coil 541 overlaps one of the first and second free ends 543 and 545. However, in the sliding-type portable terminal according to an exemplary embodiment of the present invention, the first free end 543 of the elastic member 504 is located at the inside of the front case 501 of the first housing 101, and the coil 541 is located on the guide hole 513 so as to be located on the same level as the front case 501, by which the elastic member 504 can be assembled without increasing the thickness of the terminal 100.

Figure 14:
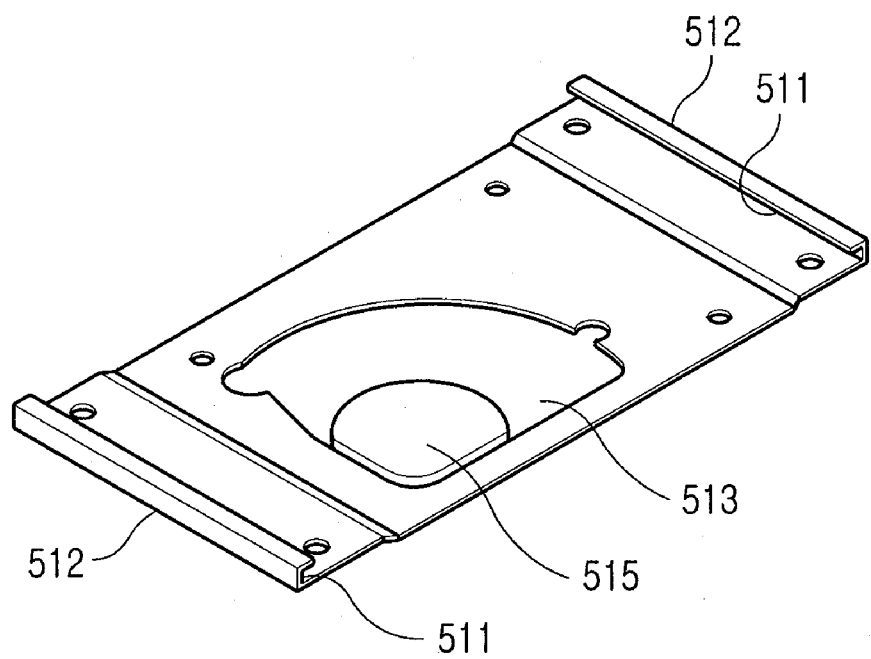
FIG. 14 is a perspective view illustrating a front case to be connected to a first housing of the portable terminal of FIG. 13.

FIG. 14 is a view of a front case 501 shown from another direction. The guide member 512 may be formed to be integrated with the front case 501 and is provided with the sliding grooves 511 for surrounding the guide rails 521. The front case 501 is also provided with the spring fixing plate 515, in which the spring fixing plate 515 has the spring rivet 517 to which the first free end 543 of the elastic member 504 can be tied. The front case 501 is provided with the guide hole 513, which allows the coil 541 of the elastic member 504 to freely rotate and to be located on the same level as the front case 501. The coil 541 of the elastic member 504 moves in the guide hole 513 while the second housing 102 is facing and sliding on the first housing 101, by which the problem is solved that the thickness of the terminal comes to be increased by the thickness of the coil 541 of the elastic member 504.

Figure 15:
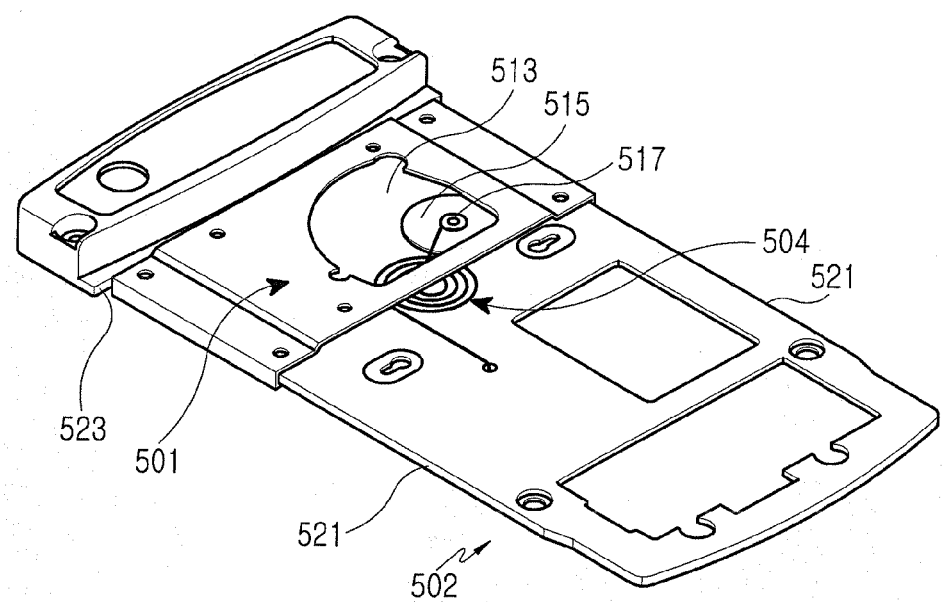
FIG. 15 is an assembled perspective view illustrating the part of the portable terminal of FIG. 13.
Figure 16:
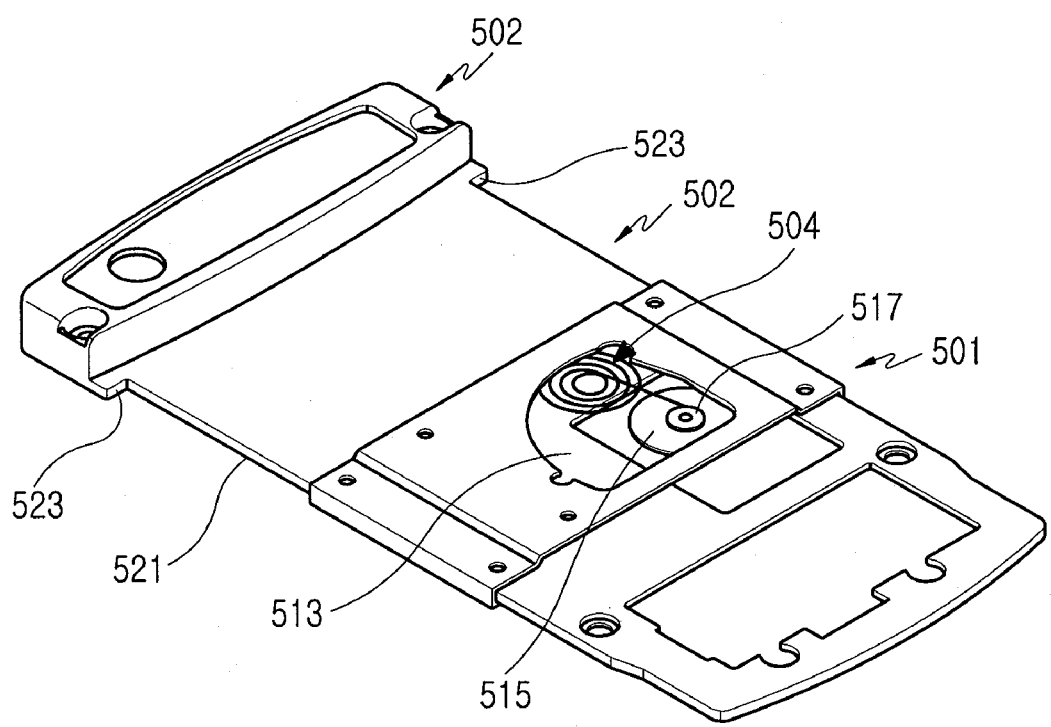
FIG. 16 is a view illustrating a part of the portable terminal of FIG. 13 in a sliding movement of a second housing.
Figure 17:
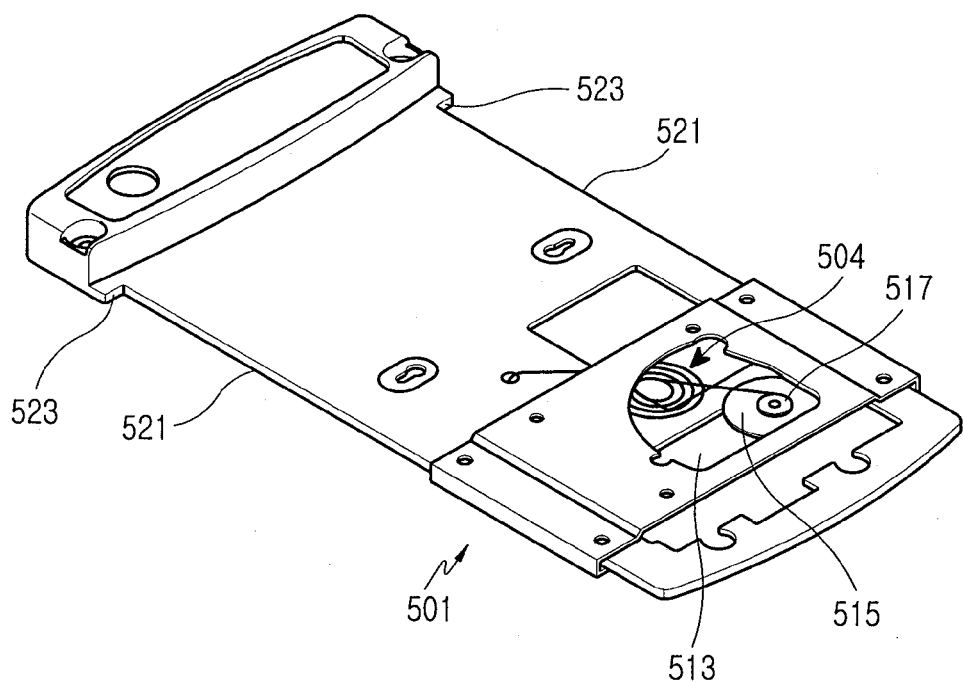
FIG. 17 is a view illustrating a part of the portable terminal of FIG. 13 in an opened state of the first housing.

FIGS. 15 to 17 show the opening/closing operation of the terminal sequentially, in which the second housing 102 slides from the closed state of the first housing 101 to open the keypad 111 of the first housing 101. Hereinafter, the opening/closing operation of the terminal will be explained with reference to FIG. 15 to 17.

FIG. 15 shows the completely closed state of the first housing 101 as shown in FIG. 1, in which the lower case 502 of the second housing 102 is located under the front case 501. As shown in FIG. 1, when the first face of the first housing 101 is completely closed, the first free end 543 of the elastic member 504 is located at a relatively upper position than the second free end 545 and provides elastic force to move the second housing 102 downward. At the same time, the guide members 512 of the front case 501 are blocked by the stopper ribs 523 disposed at the upper end of the second housing 102, so that the second housing 102 can not move downward any more. Therefore, the second housing 102 can be maintained in a stable stationary state while closing the first housing 101.

As shown in FIG. 16, when the lower case 502 of the second housing 102 gradually moves upward and thus opens the first face of the first housing 101, the second free end 545 moves upward, and thus gradually approaches the first free end 543. Therefore, the elastic force accumulated in the elastic member 504 gradually increases, wherein this elastic force acts as a driving force to move the second housing 102 downward.

The second housing 102 further moves upward to go beyond the closest approaching point at which the first free end 543 and the second free end 545 most closely approach each other, and the elastic force accumulated in the elastic member 504 is converted into a driving force to move the second housing 102 upward.

FIG. 17 corresponds to FIG. 2, in which the second housing 102 moves upward to completely open the keypad 111 of the first housing 101. When the second housing 102 moves upward so that the elastic member 504 is most opened, the second housing can not move upward any more and is stopped. Then, the second housing 102 can be maintained in a stable stationary state while opening the keypad 111. As shown in FIGS. 15 to 17, when the second housing is sliding, the helical coil 541 of the elastic member 504 moves in the guide hole 513 of the front case 501 of the first housing 101 while being located on the same level as the front case 501, thereby allowing the thickness of the terminal to be slimmed.

Figure 18:
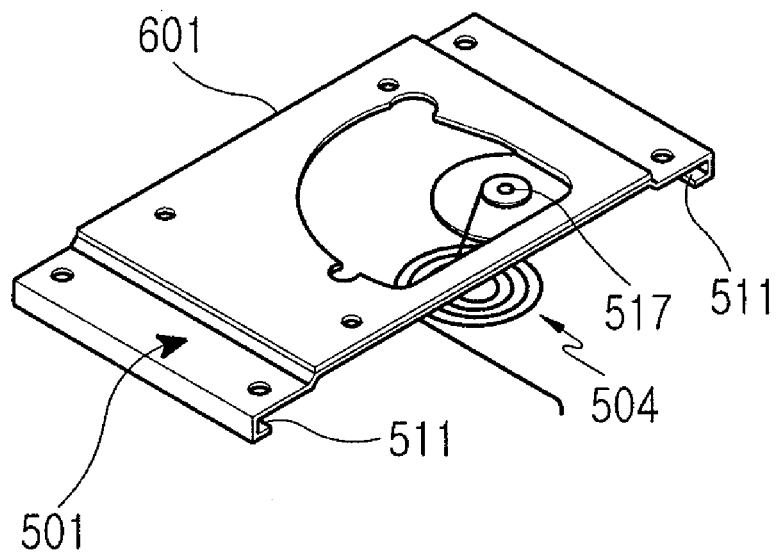
FIG. 18 is a perspective view illustrating the front case shown in FIG. 13 in which a hinge guide cap is connected to the front case.

FIG. 18 shows the front case 501 equipped with the elastic member 504 assembled therein and a hinge guide cap 601 covering the front case 501. The hinge guide cap 601 may be installed in order to prevent foreign substances from infiltrating between the first housing 101 and the second housing when the second housing 102 slides on the first housing 101 while facing the first housing 101, which, if not prevented, may have a negative influence upon the sliding operation of the terminal. The hinge guide cap 601 covers an upper portion of the front case 501 in which the covered upper portion includes the guide hole 513, so that the hinge guide cap 601 has an effect of preventing the infiltration of foreign substances which may hinder the sliding operation.

Consequently, the point at which the first free end 543 and the second free end 545 most closely approach each other exists within the sliding movement range of the second housing 102. Between a point at which the keypad 111 is closed and the point at which the first free end 543 and the second free end 545 most closely approach each other, the driving force to move the second housing 102 in the direction to close the keypad 111 is generated, and between a point at which the keypad 111 is opened and the point at which the first free end 543 and the second free end 545 most closely approach each other, the driving force to move the second housing 102 in the direction to open the keypad 111 is generated.

Accordingly, once the user moves the second housing upward only in a part of the entire range of the sliding movement of the second housing in order to open the keypad 111, the second housing 102 is moved upward by the elastic force of the elastic member 504 the rest of the way. Similarly, once the user moves the second housing 102 downward in a part of the entire range of the sliding movement of the second housing 102 in order to close the keypad 111, then the second housing 102 is moved downward by the elastic force of the elastic member 504 the rest of the way.

As described above, the sliding-type portable terminal according to an exemplary embodiment of the present invention has an advantage in that since the first housing and the second housing are slidingly connected by using the sliding guides and the rear cover closing the front case of the second housing, a simple assembling process is allowed and the number of parts required for the portable terminal is reduced. Accordingly, a labor cost required for the assembling of and a manufacturing cost of the components of the portable terminal can be reduced which in turn can reduce a product cost of the portable terminal. Also, the number of parts interposed between the first housing and the second housing is reduced, which subsequently results in a reduced thickness of the portable terminal.

In addition, the terminal according to an exemplary embodiment of the present invention includes the coil and a pair of free ends respectively extending from the coil, wherein one of the free ends is located so as to be moved within one of the housings or is moved in the guide hole of the front case of the first housing so as to be located on the same level as the front case. Therefore, the terminal has an advantage in that it is easy to reduce the thickness of the terminal. Further, according to an exemplary embodiment, only one elastic member is included for the opening/closing operation of the sliding-type portable terminal so that the space required for the installation and movement of the elastic member can be reduced. Accordingly, the space for the flexible printed circuit can be easily ensured. The manufacturing cost of the elastic member is also reduced, which ultimately results in the reduced manufacturing cost of the portable terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A sliding-type portable terminal comprising:
a first housing;
a second housing sliding in a longitudinal direction of the first housing while facing the first housing; and
an elastic member including a helical coil and a pair of free ends, the free ends extending from the coil in a direction away from each other and the elastic member providing elastic force in a direction to move the free ends away from each other, wherein the coil is interposed between the first housing and the second housing, one of the free ends is rotatably supported on a first face of the first housing, and another of the free ends is extended toward the inside of the second housing and rotatably supported on an inner surface of the second housing.

2. The sliding-type portable terminal as claimed in claim 1, wherein the second housing has a guide hole formed on a first face thereof, and wherein said another of the free ends is extended toward the inside of the second housing through the guide hole.

3. The sliding-type portable terminal as claimed in claim 2, wherein a shape of the guide hole comprises a circular arc trace.

4. The sliding-type portable terminal as claimed in claim 3, wherein the coil moves along the circular arc trace of the guide hole while the second housing is sliding.

5. The sliding-type portable terminal as claimed in claim 3, wherein the second housing comprises:
a front case; and
a rear case connected to a rear of the front case,
wherein the guide hole is formed in the rear case.

6. The sliding-type portable terminal as claimed in claim 5, wherein the first housing has a pair of guide members mounted on the first face thereof, the guide members being parallel to each other, and wherein each of the guide members at least partially surrounds a respective side of the rear case so as to be slidingly connected to the rear case, so that the guide members guide sliding movement of the second housing.

7. The sliding-type portable terminal as claimed in claim 6, wherein the rear case has stopper ribs respectively formed at both sides of an upper end thereof and both sides of a lower end thereof, wherein the stopper ribs block the guide members so as to define a sliding movement range of the second housing.

8. A sliding-type portable terminal comprising:
a first housing; and
a second housing mounted to the first housing while facing the first housing, so that the second housing slides in a longitudinal direction of the first housing to either open or close the first housing,
wherein the second housing includes a front case and a rear cover, the rear cover being mounted to a rear surface of the front case so that the rear cover closes the front case,
wherein the first housing includes at least one pair of separate sliding guides separately mounted on a front face thereof, the sliding guides being in engagement with the rear cover of the second housing for guiding sliding movement of the second housing,
wherein each of the one pair of separate sliding guides are separately mounted to the first housing with screws, and
wherein each of the sliding guides has a sliding groove, each of the sliding grooves comprising opposing surfaces facing each other and each of the sliding guides respectively being engaged with opposing sides of the first housing.

9. A sliding-type portable terminal comprising:
a first housing; and
a second housing mounted to the first housing while facing the first housing, so that the second housing slides in a longitudinal direction of the first housing to either open or close the first housing,
wherein the second housing includes a front case and a rear cover, the rear cover being mounted to a rear surface of the front case so that the rear cover closes the front case,
wherein the first housing includes at least one pair of sliding guides mounted on a front face thereof, the sliding guides being in engagement with the rear cover of the second housing for guiding sliding movement of the second housing,
wherein the sliding guides are mounted to the first housing with screws, and
wherein the sliding guides comprise a metal member, having screw holes formed therein, and a synthetic resin formed by using an insert injection.

10. A sliding-type portable terminal comprising:
a first housing; and
a second housing mounted to the first housing while facing the first housing, so that the second housing slides in a longitudinal direction of the first housing to either open or close the first housing,
wherein the second housing includes a front case and a rear cover, the rear cover being mounted to a rear surface of the front case so that the rear cover closes the front case,
wherein the first housing includes at least one pair of sliding guides mounted on a front face thereof, the sliding guides being in engagement with the rear cover of the second housing for guiding sliding movement of the second housing,
wherein the rear cover comprises sliding ribs and stoppers, each of the sliding ribs being provided at sides of the rear cover and extending in a longitudinal direction of the second housing and each of the stoppers being provided at ends of each of the sliding ribs, and
wherein each of the sliding guides has a sliding groove, each of the sliding grooves comprising opposing surfaces facing each other and each of the sliding guides respectively being engaged with opposing sides of the first housing, and
wherein each of the sliding ribs is respectively engaged with each of the sliding grooves so as to slide and further wherein the stoppers block the sliding guides so as to define a sliding movement range of the second housing.

11. A sliding-type portable terminal comprising:
a first housing; and
a second housing mounted to the first housing while facing the first housing, so that the second housing slides in a longitudinal direction of the first housing to either open or close the first housing,
wherein the second housing includes a front case and a rear cover, the rear cover being mounted to a rear surface of the front case so that the rear cover closes the front case,
wherein the first housing includes at least one pair of sliding guides mounted on a front face thereof, the sliding guides being in engagement with the rear cover of the second housing for guiding sliding movement of the second housing, and
wherein at least a part of the rear cover and the first housing are made of a metallic material, wherein the metallic material surface of the first housing is in facing contact with the rear cover.

12. A sliding-type portable terminal comprising:
a first housing;
a second housing mounted to the first housing while facing the first housing, so that the second housing slides in a longitudinal direction of the first housing to either open or close the first housing; and an elastic member comprising a coil and a pair of free ends, the free ends extending from the coil in a direction away from each other, wherein the second housing includes a front case and a rear cover, the rear cover being mounted to a rear surface of the front case so that the rear cover closes the front case, wherein the first housing includes at least one pair of sliding guides mounted on a front face thereof, the sliding guides being in engagement with the rear cover of the second housing for guiding sliding movement of the second housing and wherein one of the free ends of the elastic member is supported in the first housing and another of the free ends of the elastic member is supported in the rear cover.

13. The sliding-type portable terminal as claimed in claim 12, wherein a closest approaching point at which the free ends most closely approach each other exists within a movement range of the second housing, wherein when the second housing is located at one side of the closest approaching point, the elastic member provides a driving force acting in a direction to move the second housing to open the first housing, and wherein when the second housing is located at another side of the closest approaching point, the elastic member provides a driving force acting in a direction to move the second housing to close the first housing.

14. The sliding-type portable terminal as claimed in claim 12, wherein said one of the free ends surrounds a rivet fixed to the first housing.

15. The sliding-type portable terminal as claimed in claim 12, further comprising at least one support hole formed in the rear cover, wherein said another of the free ends is supported at the support hole.

16. A sliding-type portable terminal comprising:

a first housing having a protrusion formed at one end thereof;

a transmitting unit provided in the protrusion;

a second housing mounted to the first housing while facing the first housing, so that the second housing slides in a longitudinal direction of the first housing to either open or close the first housing, wherein the second housing includes a front case and a rear cover, the rear cover being mounted to a rear surface of the front case so that the rear cover closes the front case, wherein the first housing includes at least one pair of sliding guides mounted on a front face thereof, the sliding guides being in engagement with the rear cover of the second housing for guiding sliding movement of the second housing, and wherein when the second housing closes the first housing, one end of the second housing is in contact with the protrusion.

17. The sliding-type portable terminal as claimed in claim 16, further comprising a keypad arranged in the first housing, wherein when the first housing is opened, the keypad is exposed while being located between the second housing and the protrusion.

18. A sliding-type portable terminal comprising:

a first housing;

a second housing sliding in a longitudinal direction of the first housing while facing the first housing; and an elastic member including a helical coil and a pair of free ends, the free ends extending from the coil in a direction away from each other and the elastic member providing elastic force in a direction to move the free ends away from each other, wherein the coil is interposed between the first housing and the second housing, one of the free ends is rotatably supported on a first face of the second housing, and another of the free ends is extended toward an inside of the first housing and is rotatably supported on an inner surface of the first housing.

19. The sliding-type portable terminal as claimed in claim 18, wherein the first housing comprises a spring fixing plate on one surface thereof, the spring fixing plate comprising a rivet mounted thereon, wherein said another of the free ends is rotatably fixed to the rivet.

20. The sliding-type portable terminal as claimed in claim 19, wherein the first housing further comprises a guide hole extending around the spring fixing plate, the guide hole having a circular arc shape, wherein the coil moves on the guide hole and along a trace of the guide hole when the second housing slides.

21. The sliding-type portable terminal as claimed in claim 20, wherein the first housing further comprises a front case mounted on a first surface thereof, wherein the guide hole is formed in the front case.

22. The sliding-type portable terminal as claimed in claim 21, wherein the front case of the first housing comprises a pair of guide members mounted on a first surface thereof, the guide members being parallel to each other, wherein the guide members are slidingly connected to the lower case of the second housing while respectively surrounding both side ends of the lower case of the second housing, so that the guide members guide a sliding movement of the second housing.

23. The sliding-type portable terminal as claimed in claim 22, wherein the front case of the first housing further comprises a hinge guide cap covering the guide hole and the spring fixing plate.

24. The sliding-type portable terminal as claimed in claim 21, wherein the lower case of the second housing comprises stopper ribs in an upper end thereof, and further wherein the stopper ribs block the guide members so as to define a sliding movement range of the second housing.

25. The sliding-type portable terminal as claimed in claim 18, wherein the second housing comprises:

an upper case; and a lower case connected to the upper case while facing the upper case and comprising a rivet formed thereon, wherein the rivet rotatably supports one of the free ends of the elastic member.

26. The sliding-type portable terminal as claimed in claim 18, wherein the helical coil of the elastic member is located on the same level as the front case in the guide hole.

* * * * *